United States Patent [19]

Stankewitz et al.

[11] 4,386,830
[45] Jun. 7, 1983

[54] INCIDENT LIGHT, BRIGHT-FIELD KOHLER ILLUMINATING DEVICE

[75] Inventors: Hans-Werner Stankewitz, Steindorf; Hans Determann, Nauborn; Guenter Reinheimer, Biebertal, all of Fed. Rep. of Germany

[73] Assignee: Ernst Leitz Wetzlar GmbH, Wetzlar, Fed. Rep. of Germany

[21] Appl. No.: 298,158

[22] Filed: Aug. 31, 1981

[30] Foreign Application Priority Data

Sep. 8, 1980 [DE] Fed. Rep. of Germany ....... 3033758

[51] Int. Cl.³ ............................................. G02B 21/06
[52] U.S. Cl. ...................................... 350/524; 350/527
[58] Field of Search ............... 350/523, 524, 527, 571, 350/436, 237

[56] References Cited

U.S. PATENT DOCUMENTS

| | | | |
|---|---|---|---|
| 1,891,348 | 12/1932 | Ellinger et al. | 350/237 X |
| 2,128,394 | 8/1938 | Berek | 350/524 |
| 2,192,295 | 3/1940 | Berek | 350/524 |

Primary Examiner—John K. Corbin
Assistant Examiner—Matthew W. Koren
Attorney, Agent, or Firm—Schwartz, Jeffery, Schwaab, Mack, Blumenthal & Koch

[57] ABSTRACT

An incident light, bright-field, Kohler illuminating device for a microscope which reflects an illuminating beam into one half of the pupil of a microscope objective, which avoids vignetting of the field of vision without requiring especially short objectives, which can provide illumination with polarized light, and which can be added to any transmitted light microscope including microscopes with revolvable turrets without requiring a specially designed microscope stand.

14 Claims, 6 Drawing Figures

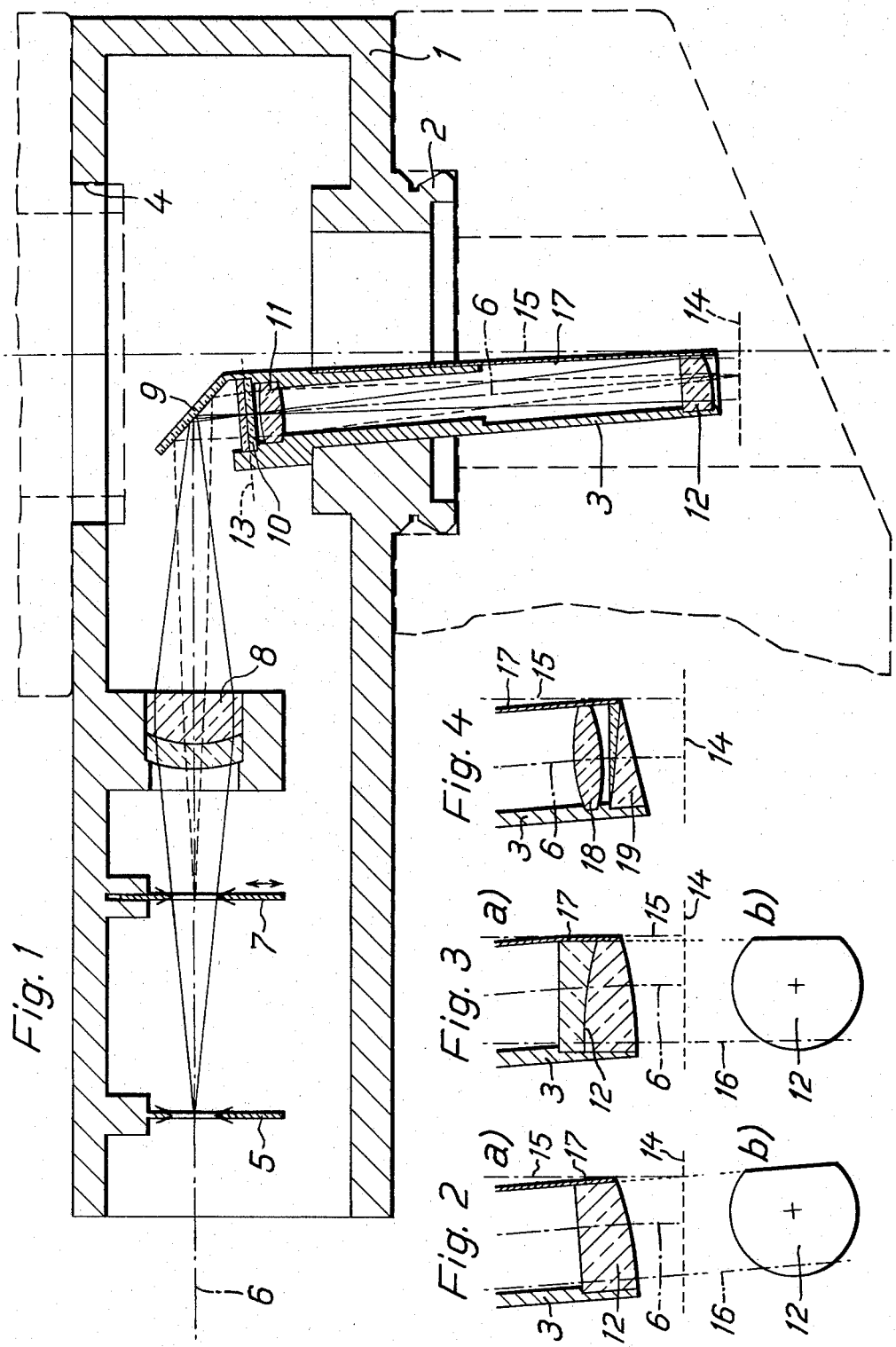

INCIDENT LIGHT, BRIGHT-FIELD KOHLER ILLUMINATING DEVICE

BACKGROUND OF THE INVENTION

The invention relates to an incident light, bright-field, Kohler illuminating device for microscopes which reflects an illuminating beam into one half of the pupil of a microscope objective.

In the reference work "ABC's of Optics" by K. Mutze, Werner Dausin Press, Hanau (1961), illuminating devices of the aforementioned type are described and illustrated on pages 560–561. The device most like the invention is designated as a prism illuminator. The illuminating light is reflected from the hypotenuse of a rectangular prism toward the objective and passed through the objective onto the object. The prism covers half of the exit pupil. Imaging of the object is effected through the other half of the exit pupil. In order to prevent vignetting of the field of vision, the prism must be located, insofar as possible, in the exit pupil of the objective. Consequently, the incident light, bright-field objectives are formed especially short.

Illuminating devices of this type have the advantage of almost complete utilization of the reflected illuminating light. They may be used for a strictly Kohler type illumination, in which a luminous-field diaphragm is imaged in the object plane and an aperture diaphragm is imaged in the exit pupil of the microscope objective. If a so-called Berek prism is used, polar incident light illumination is also possible. A disadvantage, on the other hand, consists of the short distance of the prism from the objective required for the satisfactory imaging of the object; which makes a special design of the microscope stand necessary. Interchangeable illuminating devices of this type are usually found only in microscopes with individually interchangeable objectives and not with revolvably changeable objectives. It is not possible to subsequently equip a transmitted light microscope with such an illuminating device.

SUMMARY OF THE INVENTION

Accordingly, it is an object of the present invention to provide a new incident light, bright-field, Kohler illuminating device for microscopes.

It is also an object of the present invention to provide an incident light, bright-field, Kohler illuminating device for microscopes which avoids vignetting of the field of vision.

Another object of the present invention is to provide an incident light, bright-field, Kohler illuminating device for microscopes which does not require especially short objectives.

A further object of the present invention is to provide an incident light, bright-field Kohler illuminating device for microscopes which can provide illumination with polarized light.

An additional object of the present invention is to provide an incident light, bright-field, Kohler illuminating device for microscopes which does not require a special microscope stand design.

Yet another object of the present invention is to provide an incident light, bright-field, Kohler illuminating device which can be used with microscopes with individually interchangeable objectives or with revolvable turrets bearing multiple objectives.

A still further object of the present invention is to provide an interchangeable incident light, bright-field, Kohler illuminating device for microscopes which can be added in simple fashion to any transmitted light microscope.

These and other objects of the invention are achieved by providing an incident light, bright-field, Kohler illuminating device for a microscope which reflects an illuminating beam into one half of the pupil of a microscope objective; said illuminating device comprising (a) a luminous field diaphragm;

(b) a first optical element for producing an intermediate image of said luminous field diaphragm;

(c) a deflecting mirror disposed adjacent said intermediate image of the luminous field diaphragm; said deflecting mirror covering less than half of the cross section of the observation beam of said microscope and having an inclination such that the optical axis of an illuminating beam deflected by said mirror converges with the optical axis of the microscope objectives;

(d) an aperture diaphragm;

(e) means disposed adjacent said intermediate image of the luminous field diaphragm for imaging said aperture diaphragm; and (f) a second optical element disposed adjacent the pupil of the microscope objective for deflecting the optical axis of an illuminating beam such that the rearward extension of the illuminating beam passes through the center of an intermediate image produced by the microscope objective.

In a further preferred aspect of the invention a field lens is disposed adjacent the intermediate image of the luminous field diaphragm. In yet another preferred aspect of the invention the deflecting mirror is a concave mirror. In another preferred aspect, a polarizer is disposed directly after the deflecting mirror. In still further preferred aspects of the invention, the optical element for deflecting the optical axis of the illuminating beam is a lens positioned excentrically with respect to the optical axis of the illuminating beam; the optical axis of said lens is oriented either parallel to the optical axis of the microscope objective or parallel to the axis of the illuminating beam or intermediate these two axes; the lens has a flat surface on the light entry side perpendicular to the optical axis of the entering illuminating beam; or the lens is formed as a cemented element. In yet other preferred aspects of the invention, said second optical element comprises a lens centered with respect to the optical axis of the illuminating beam and a beam deflecting prism; the second optical element is chromatically corrected to compensate for the dispersion resulting from deflection of the illuminating beam, and the optical elements which follow the deflecting mirror are disposed in a sleeve.

BRIEF DESCRIPTION OF THE DRAWINGS

Further details of the invention will be apparent from a consideration of the appended drawings wherein:

FIG. 1 is a vertical cross section of an illuminating device according to the invention;

FIG. 2(a) is an enlarged sectional view of the beam deflecting optical element of FIG. 1;

FIG. 2(b) is a plan view of the optical element of FIG. 2(a);

FIG. 3(a) is a sectional view of a first alternate beam deflecting optical element;

FIG. 3(b) is a plan view of the optical element of FIG. 3(a); and

FIG. 4 is a sectional view of a second alternate beam deflecting optical element.

DETAILED DESCRIPTION OF PREFERRED EMBODIMENTS

The illuminating device shown in FIG. 1 is constructed as a separate structural unit, capable of being placed on the bow or frame of a microscope stand, not shown. Housing 1 is open on the light inlet side. A conventional lamp housing may be connected to the open end of the housing.

On the light exit side, the housing 1 has a suitable connecting fitting 2, which may be inserted in the tube changer in the microscope stand. The illuminating beam is passed inside a sleeve 3 through the connecting fitting 2, whereby only part of one half of the opening in the connecting fitting is utilized. The sleeve 3 extends through the bore provided for the illuminating beam in the microscope stand to a point close to the exit pupil of a microscope objective, not shown. An opening 4 is provided on the top of housing 1, into which an ocular tube may be inserted.

Within the housing 1, as viewed in the direction of the light, there is provided a variable luminous field diaphragm 5, a variable aperture diaphragm 7 which is displaceable perpendicular to the optical axis 6, a condenser lens 8, a deflecting mirror 9, a polarizing filter 10, a field lens 11 and a beam deflecting optical element 12.

The condenser lens 8 produces an intermediate image of the luminous field diaphragm 5 in plane 13. A field lens 11 is disposed adjacent this point. The luminous field beam is resolved by optical element 12 toward infinity and thereby shines out through one half of the exit pupil of the subsequent microscope objective, not shown.

The aperture diaphragm is imaged essentially by the field lens 11 in plane 14. This plane marks the location of the exit pupil of the microscope objective. By adjusting the aperture diaphragm 7 perpendicularly to the optical axis 6, the image of the diaphragm may be displaced in plane 14 relative to the optical axis 15 of the microscope objective. In this manner, the angle of illumination may also be varied.

The inclination of the deflecting mirror 9 is chosen so that after deflection the optical axis 6 will converge with optical axis 15. By this measure, the mirror 9 including its lower boundary edge may be shifted out of the optical axis 15 so that the observation beam will not be vignetted. If the inclined optical axis 6 is extended through the microscope objective, the luminous field will not be centered with respect to the optical axis 15 in the object plane. In order to achieve this centering, the optical element 12 performs both imaging and beam deflecting functions. The deflection is performed in such a fashion that the rearward extension of the optical axis 6 passes through the center of the intermediate image produced by the objective. In the case of an objective which resolves an image toward infinity, this means that the optical axis is oriented parallel to optical axis 15. In the illustrated embodiment, the deflecting mirror 9 is flat and the field lens 11 follows the mirror. With slight alterations of the optical character of the imaging system, it is also possible for the field lens 11 to precede the polarizer 10. This may be of advantage in combination with a polarized illuminating device, since all of the optical elements following the polarizing filter must be strain (distortion) free. Field lens 11 may be eliminated entirely if deflecting mirror 9 is concave and simultaneously performs the imaging of the aperture diaphragm 7.

The construction of the illuminating device according to the invention has the advantage that following deflection of the illuminating beam, there remains sufficient space for insertion of a polarizing filter 10. In the illustrated embodiment the polarizing filter lies in the intermediate image plane 13 of the luminous field diaphragm 5. It is critically important that the polarizing filter 10 be positioned after the deflecting mirror 9, since all reflecting surfaces exert a depolarizing effect.

Further details of the construction of optical element 12 may be seen in FIGS. 2 through 4. The lens shown in FIG. 2 corresponds to the optical element 12 illustrated in FIG. 1.

An optical element 12, shown in plan in FIG. 2b, is cut eccentrically from a lens having an optical axis 16 (FIG. 2a). The optical axis 6 of the illuminating beam passes through the center the optical element which is marked with a cross. Element 12 has a flat surface on the light inlet side. Element 12 is set in sleeve 3 so that optical axis 6 is perpendicular to said flat surface. The side with the cut segment points toward optical axis 15. This arrangement results in a linear boundary between the illuminating beam and the observation beam. Sleeve 3 is cut away along a line corresponding to the straight side of element 12 and then closed off with a plate 17, so that no scattered light can enter the path of the observation beam.

The design of element 12 in FIG. 3 is basically the same as in FIG. 2. The element is set in sleeve 3, however, in such a way that lens axis 16 is oriented parallel to optical axis 15. The optical axis 6 is therefore inclined with respect to the flat surface on the light inlet side of element 12. Since the axis 6 is also the longitudinal axis of sleeve 3, the mounting bore for element 12 must therefore exhibit a corresponding angle with respect to axis 6. These production difficulties are not encountered with the arrangement of FIG. 2. However, in the arrangement according to FIG. 3, the light inlet surface of the element 12 has a beam deflecting effect, so that in this case the necessary refractive power may be distributed between two surfaces.

Since in the case of illumination with white light, the deflection of the beam is accompanied by a dispersion of the light beam, chromatic bleeding occurs in the image of the luminous field diaphragm. In order to prevent this, it is advantageous to provide the element 12 in the form of a chromatically corrected cemented element, as illustrated in FIG. 3.

As previously described, element 12 performs two functions. The two functions may also be divided between two separate elements. In FIG. 4 a lens element 18 centered on the optical axis 6 serves for further imaging of the luminous field diaphragm. The deflection of the beam is effected by a prism 19, which in order to eliminate dispersion, may also be cemented.

The foregoing embodiments have been set forth merely as illustrative examples of the invention and are not intended to be limiting. Since modifications of the disclosed embodiments incorporating the spirit and substance of the invention may occur to persons skilled in the art, the scope of the invention is to be limited solely by the scope of the appended claims and equivalents.

We claim:

1. An incident light, bright-field, Kohler illuminating device for a microscope which reflects an illuminating beam into one half of the pupil of a microscope objective; said illuminating device comprising:
   (a) luminous field diaphragm;
   (b) a first optical element for producing an intermediate image of said luminous field diaphragm;
   (c) a deflecting mirror disposed adjacent said intermediate image of the luminous field diaphragm, said deflecting mirror covering less than half of the cross section of the observation beam of said microscope and having an inclination such that the optical axis of an illuminating beam deflected by said mirror converges with the optical axis of the microscope objective;
   (d) an aperture diaphragm;
   (e) means disposed adjacent said intermediate image of the luminous field diaphragm for imaging said aperture diaphragm; and
   (f) a second optical element disposed adjacent the pupil of the microscope objective for deflecting the optical axis of an illuminating beam such that the rearward extension of the illuminating beam passes through the center of an intermediate image produced by the microscope objective.

2. An illuminating device according to claim 1 wherein said second optical element is disposed at the pupil of the microscope objective.

3. An illuminating device according to claim 1 further comprising a field lens disposed adjacent the intermediate image of the luminous field diaphragm.

4. An illuminating device according to claim 1 wherein said deflecting mirror is a concave mirror.

5. An illuminating device according to claim 1 further comprising a polarizing means directly following said deflecting mirror.

6. An illuminating device according to claim 1 wherein said second optical element comprises a lens positioned eccentrically with respect to the optical axis of an illuminating beam deflected by said deflecting mirror.

7. An illuminating means according to claim 6 wherein the optical axis of said lens is parallel to the optical axis of the microscope objective.

8. An illuminating device according to claim 6 wherein the optical axis of said lens is parallel to the axis of said deflected illuminating beam.

9. An illuminating device according to claim 6 wherein the optical axis of said lens lies intermediate the optical axis of the microscope objective and the axis of an illuminating beam deflected by said deflecting mirror.

10. An illuminating device according to claim 6 wherein said lens has a flat surface on the light entry side perpendicular to the optical axis of an entering illuminating beam.

11. An illuminating device according to claim 6 wherein said lens is formed as a cemented element.

12. An illuminating device according to claim 1 wherein said second optical element comprises a lens centered with respect to the optical axis of an illuminating beam deflected by said mirror and a beam deflecting prism.

13. An illuminating device according to claim 1 wherein said second optical element is chromatically corrected to compensate for the dispersion resulting from deflection of the illuminating beam.

14. An illuminating device according to claim 1 wherein the optical elements which follow the deflecting mirror are disposed in a sleeve.

* * * * *